June 22, 1937.    A. SCAISON    2,084,507
COASTER BRAKE
Filed March 19, 1936
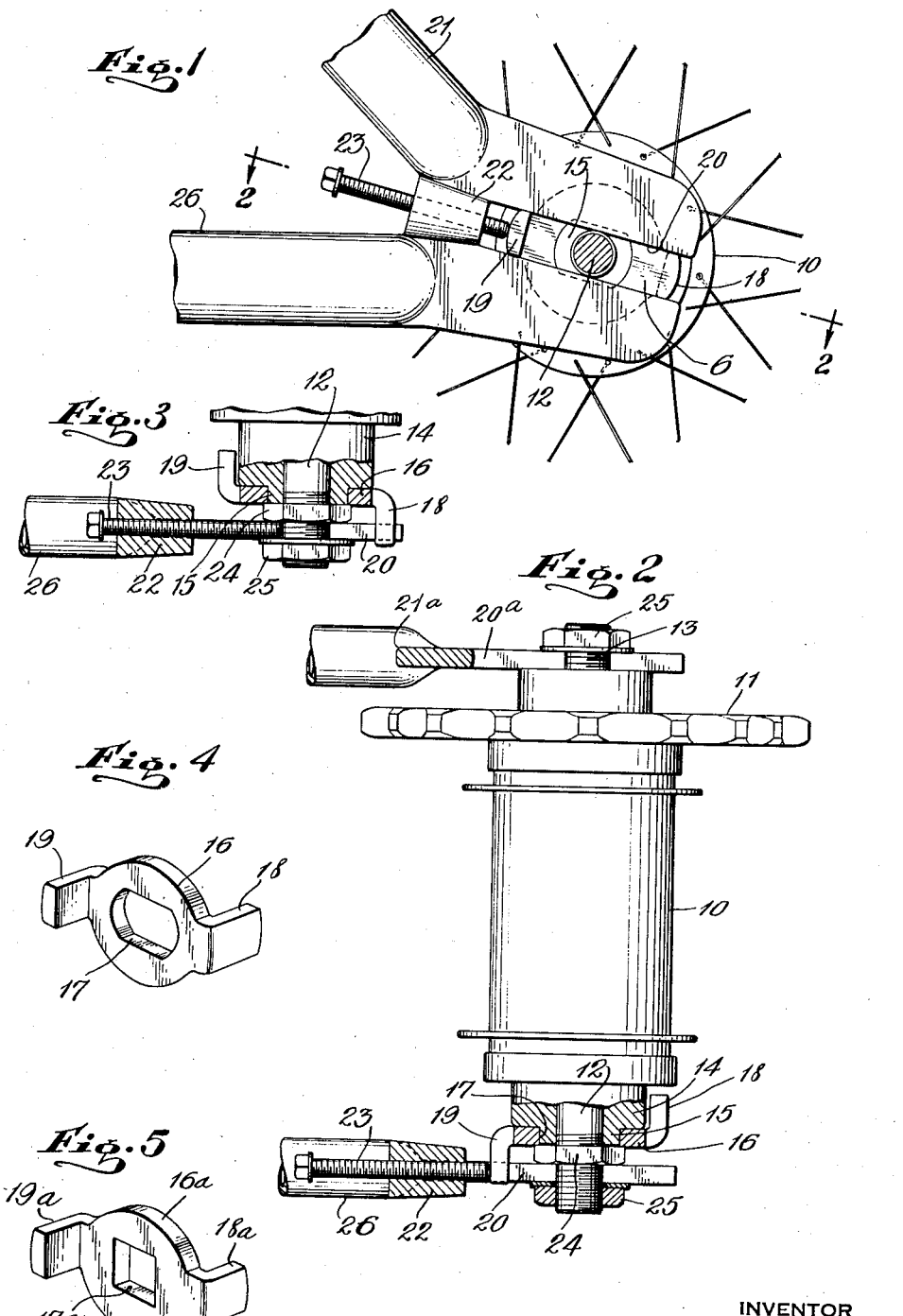
INVENTOR
ALEXANDER SCAISON
BY
Howard E. Thompson
ATTORNEY Patented June 22, 1937

2,084,507

UNITED STATES PATENT OFFICE 2,084,507

COASTER BRAKE

Alexander Scaison, New York, N. Y.

Application March 19, 1936, Serial No. 69,632

5 Claims. (Cl. 192—6)

This invention relates to coaster brakes such as commonly employed in connection with bicycles and other kinds and classes of wheeled goods for braking the action of one or more wheels of a vehicle of this type; and the object of the invention is to provide a simple, economical as well as strong and durable means for coupling the brake cylinder with the frame of the vehicle as well as to provide a device of this class which will permit a wide range of wheel adjustment in the frame to control the adjustment of the drive chain employed; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a side and sectional view of the hub portion of a drive wheel and a part of the frame in which the wheel is mounted showing one of my improved devices.

Fig. 2 is a partial section on the line 2—2 of Fig. 1.

Fig. 3 is a view similar to Fig. 2 showing only a part of the construction and showing another position of the device which I employ.

Fig. 4 is a perspective of one of the devices shown in Figs. 1 to 3 inclusive, detached; and, Fig. 5 is a view similar to Fig. 4 showing a modified form of device.

In Figs. 1 and 2 of the drawing, I have shown at 10 the hub portion of the drive wheel of a bicycle or similar vehicle, which hub portion is of any conventional coaster brake type including at one side a drive sprocket 11. At 12, I have shown one projecting trunnion of the hub portion and at 13 the opposed projecting trunnion, the trunnion 12 extending through a cylinder 14 of the coaster brake which has a substantially elliptical shank portion 15 forming a key for retaining one of my improved brake backing or retaining members or washers 16 against rotary movement upon the cylinder 14.

The member or washer 16 is shown in detail in Fig. 4 of the drawing and is provided with a substantially elliptical opening 17 which fits the shank or key portion 15 as above stated. The member 16 has oppositely projecting lugs or clips 18 and 19 on opposite side walls thereof which are adapted to fit in an elongated slot 20 formed in the frame 21 of the bicycle or other vehicle. This slotted or forked frame construction is more or less standard in equipment and design of bicycle construction. The frame at the inner end of the slot 20 is provided with an enlargement 22 in which is mounted an adjustment screw 23 for adjusting the position of the wheel hub in the slots of the side frame members, the companion frame member being indicated at 21a and the slot thereof at 20a as seen in Fig. 2 of the drawing.

In the construction shown in Figs. 1 and 2, the lug 19 is shown projecting outwardly and arranged within the slot 20 of the frame with the other lug 18 disposed around the cylinder 14; whereas, in Fig. 3 of the drawing, the washer or member 16 is reversed and the lug 18 is disposed in the slot 20, whereas the lug 19 is arranged around the cylinder 14. The washer 16, in both methods of its mounting, is held in position by a nut 24 and the hub portion or the spindles or studs 12 and 13 thereof are held in different positions of adjustment in the frames 21, 21a by nuts 25, as clearly seen in Fig. 2 of the drawing.

In Fig. 5 of the drawing, I have shown a slight modification in the form of the backing member or washer. In this figure, 16a represents the washer having the projecting lugs 18a and 19a similar to the lugs 18 and 19. But, substituted for the substantially elliptical aperture 17 is a square or rectangular aperture 17a to adapt this device to coaster brakes having a different cross sectional form on the key member 15 of the cylinder 14. It will be understood that any other form or aperture or method of keying the parts together may be employed.

In vehicles of the type under consideration, it has been customary to employ a long curved arm, one end of which would fit the key member 15 of the cylinder 14, and the other end of which is provided with means for detachably coupling the same to one of the parts or tubes of the frame, for example, the part 26 seen in Fig. 1 of the drawing. By reason of the method of its mounting on the frame, this arm construction complicated the adjustment of the wheel in the frame and at the same time was found to be objectionable and impractical from the standpoint of breakage; and by reason of the structure of this arm, the replacement cost thereof was relatively high, whereas with my improved washer or other backing member, the desired result is accomplished in a simpler and more economical manner. Should the same become broken or otherwise rendered useless, the replacement can be made at a very nominal cost. However, by virtue of the strength of the device employed, the tendency to break is substantially eliminated, or reduced to a large degree. My improved device lends itself to a wider range of adjustment of the wheel in the frame, as will be apparent, in comparing the two distinct uses of the device as illustrated in Figs. 2 and 3 of the drawing.

My improved device acts as a means for coupling the cylinder 14 with the frame of the vehicle to prevent rotation of the cylinder against which the braking action of the vehicle takes place. While I have shown my device in preferred forms of construction, slight changes or variations may be made in the design or contour thereof to suit various types of installations and the different types of coaster brake constructions which are employed as well as modifications in the form of the frame structure of the vehicle. A single lug may be provided on the member 16, 16a to provide for one use thereof instead of the dual use illustrated in the drawing. The members 16, 16a will be of such thickness as to fit the depth of the angular shanks 15.

Having fully described my invention, what I claim as new and desire to secure by Letters Patent, is:

1. The combination with a coaster brake for vehicles of the character described, of means for coupling the cylinder of the brake with the vehicle frame to prevent rotation in said frame, said means comprising a disk-shaped member, means on said member and said cylinder for coupling the same together, said member having a part engaging the frame in close proximity to said cylinder to prevent rotation of the cylinder with respect to said frame, the part on said member projecting angularly from one side surface thereof, and another similar projecting part projecting in the direction of the opposite side face of said member.

2. In a bicycle, the frame of which is provided with an elongated aperture for adjustably mounting the drive wheel of the bicycle in said frame, the axis of said drive wheel including a coaster brake structure, means keyed to the cylinder of the coaster brake structure and extending into the aperture of said frame for retaining said cylinder against rotation in the frame, said means comprising a disk-shaped body having an angular aperture centrally thereof, and the peripheral wall of said member having an angularly extending lug.

3. In a bicycle, the frame of which is provided with an elongated aperture for adjustably mounting the drive wheel of the bicycle in said frame, the axis of said drive wheel including a coaster brake structure, means keyed to the cylinder of the coaster brake structure and extending into the aperture of said frame for retaining said cylinder against rotation in the frame, said means comprising a disk-shaped body having an angular aperture centrally thereof, the peripheral wall of said member having an angularly extending lug, and an opposed wall of said member having another angularly extending lug.

4. A coupling member for the coaster brakes of wheeled vehicles comprising a disk-shaped body having centrally thereof an aperture of irregular contour, the peripheral edge of said disk having an angularly extending lug projecting in the direction of one side face of said member, and another projecting lug extending in the direction of the opposite side face of said member.

5. In a bicycle, the frame of which is provided with an elongated aperture for adjustably mounting the drive wheel of the bicycle in said frame, and a coaster brake device arranged on the axis of said drive wheel, a part of said device having a projecting angular portion, a coupling disk for keying said device against rotation in the frame, said disk having an angular aperture adapted to fit on the angular projection of said coaster brake part to key the same thereto, and one surface of said disk having a projection adapted to enter the elongated aperture in said frame to key said disk and part against rotary movement in the frame.

ALEXANDER SCAISON.